R. EICKEMEYER.
Mechanical Movements.

No. 139,379.    Patented May 27, 1873.

Fig. 1.
Fig. 2.
Fig. 3.
Fig. 4.
Fig. 5.
Fig. 6.
Fig. 7.
Fig. 8.
Fig. 9.

Witnesses.
Phil. T. Sarnet
G. F. Stenz

Inventor:
Rudolf Eickemeyer
By Mr. C. Wood
Atty.

UNITED STATES PATENT OFFICE.

RUDOLF EICKEMEYER, OF YONKERS, NEW YORK.

IMPROVEMENT IN MECHANICAL MOVEMENTS.

Specification forming part of Letters Patent No. 139,379, dated May 27, 1873; application filed May 13, 1873.

*To all whom it may concern:*

Be it known that I, RUDOLF EICKEMEYER, of Yonkers, in the county of Westchester and State of New York, have invented a certain new and useful Mechanical Movement for Converting Rotary Motion into a Longitudinally-Reciprocating Movement, or the reverse thereof.

My invention consists mainly in a novel radially-vibrating crank-arm, which is hinged at the end of a rotating shaft, on an axis which is set at right angles to the axial line of the shaft, and in combining the same with a longitudinally-reciprocating rod, with which it is connected by means of a universal joint, whereby the continuous rotation of the shaft will impart to the rod a smooth and easy reciprocating movement. My invention, in detail, further consists in certain novel combinations of devices for controlling the axis of the hinged crank-arm, and also for effecting and maintaining the proper connection of the crank-arm with the reciprocating rod; and I do hereby declare that the following specification, taken in connection with the drawings furnished and forming a part of the same, is a true and accurate description of the several features of my invention.

In the drawings, Figure 1 represents, in front elevation, an organization of mechanism which embodies my invention. Fig. 2 represents the same in plan section on a plane coincident with the longitudinal axes of the rotating crank-shaft and reciprocating rod. Fig. 3 represents the same in vertical section, through the longitudinal center of the crank-arm, on a line transverse to the axial line of the crank-shaft. Fig. 4 represents the crank-shaft as if advanced about one-quarter of a revolution from the position shown in Figs. 1, 2, and 3. Fig. 5 represents in front view a crank-arm of slightly different construction, but which embodies my invention. Fig. 6 represents the modification, Fig. 5, in vertical section on a line with the axis of the crank-shaft. Figs. 7, 8, and 9, represent, in section, other modifications thereof.

The crank-shaft A is fitted to bearings, one of which is shown at B in Figs. 1, 2, and 4. On the outer end of the crank-shaft is a crank-head, C, which can be made in any desirable form; as shown in Fig. 3, it approximates in section to a triangular form, while in Fig. 5 it is circular. To prevent endwise movement of the crank-shaft, and to compensate from time to time for the wear induced by the intermittent longitudinal strain thereon, I have cut on the shaft adjacent to the bearing an external screw-thread, to which is fitted the two nuts $b$. The inner one is faced off to correspond with a milled seat on the side of the bearing, so that the longitudinal strain on the shaft will be borne thereby, and as the face wears away the inner nut can be set up and secured in position by the outer one, which serves as a jam-nut. Should it be deemed desirable, a steel ring can be attached to the side of the bearing, and the inner nut $b$ case-hardened with highly-finished bearing-surfaces. Instead of the nuts, precisely as constructed, any collar, adjustable longitudinally on the shaft, would serve the same purpose. The crank-head, when made in circular form, as shown in Fig. 5, serves as a balance-wheel, and, by a proper distribution of metal, can be accurately balanced. When desired, it can be made solid with the crank-shaft, as represented in Figs. 7 and 8. D denotes the crank-arm. Its form can be varied to meet special requirements. It is represented in several figures of the drawings as bow-shaped, but it can, obviously, be made of different form, as, for instance, when arranged as shown in Figs 7 and 8. In the latter instance, it is represented as rectangular in form, and provided with solid hinge-pins which project from it at the end, one on each side. The crank-arm is essentially hinged to the crank-head C in such a manner that its free end can swing or vibrate outward from the face of the crank-head. In Figs. 1, 2, 3, and 4 the crank-arm is shown to be hinged by means of the pin $c$, which is permanently fixed in the crank arm, with its axis on a line which is at exact right angles to the axial line of the crank-shaft, and at a distance therefrom equal to one-half the whole length of the crank movement desired. The bearings for the pin $c$ are partially in the crank-head, and partially against the cap $d$, which is held to the head by the bolts $e$, and due provision is made whereby the wear of the pin may be compensated or taken up from time to time. As there is always more or less endwise strain on the pin c, it is essential that it be at all times snugly confined in its bearings, and it is also essential that it be controllable longitudinally without objectionably compressing the ends of the crank-arm. I accomplish this by constructing the pin with a threaded end of lessened diameter and fitting thereto a sleeve-nut, f, by which the head of the pin, and the adjacent coincident surfaces of the crank-arm and crank-head, are kept in close relation and can from time to time be set up to compensate for such wear as may occur. The outer circumference of the sleeve-nut f, is also threaded and it is equal to the circumference of the main portion of the pin, and to that portion of it the eye on the adjacent portion of the crank-arm is fitted by an annular screw-threaded recess. The nut g, fitted to the outer threaded end, completes this portion of the device. As will be seen in Figs. 1 and 3, the sleeve-nut f is readily accessible, and can at any time be adjusted. In Figs. 5 and 6 the crank-arm occupies a recess in the disk, and the pin c is made adjustable by the nuts h, which serve as steps, and which are accessible from each side of the disk, and are capable of being set by the screws i, located in recesses cut in the face of the disk or crank-head C. The cap d in Figs. 5 and 6 is confined to the crank-head by the bolts m, and is rendered adjustable by means of the set-screws n, which engage with adjacent surfaces of a recess in the disk. The crank-arm D, and its pin, may be made in one piece when, as in Figs. 7 and 8, it is located on the crank-head wholly on one side of the crank-shaft, and its boxes or bearings may be constructed with a separate cap, d, on each side of the arm, and also with adjusting bolts or nuts, substantially as shown in Fig. 5. E denotes the reciprocating rod by which rotary motion is to be imparted to the crank-shaft, or which is to receive its reciprocating movement by the rotation of the crank-shaft. It must be so set that its axial line will be in the same horizontal plane as the crank-shaft, and at exact right angles thereto. In order to avoid all possibility of springing, it should be provided with well-fitted slide-bearings o, located at such a distance from each other as will be slightly greater than the whole longitudinal movement of the rod. This rod may be so connected with the crank-shaft that it will partially rotate to and fro on its axis as it slides back and forth, or so that no rotary movement thereof will occur. It is to be undersood that the vibrating crank-arm is connected to the rod by means of a universal joint, and that this can preferably be effected by having, as in Figs. 1 to 5 inclusive, a wrist-pin, F, with a globular head, and a socket embracing it, which is secured to the rod, or by providing in the crank-arm, at the proper location for the wrist-pin, a socket for receiving the ball of an arm which corresponds in operative function with the wrist-pin.

When the wrist-pin is employed the socket-connection G will be made in two equal parts, one of which may be keyed or otherwise secured to the rod, and the other part will essentially be adjustable with relation thereto, in order that the ball may be embraced and the wear taken up. As illustrated in Figs. 1 and 2, the parts of the socket G are united by means of the bolt p, which passes through ears thereon, on the rear side. It is desirable that these parts shall be readily adjustable, in order that the wear can be taken up and the parts maintained in proper relation with each other, and at the same time firmly held without undue compression of the ball. All of this is attained by me in the employment of the threaded sleeve-nut q, the interior of which is fitted to the thread on the bolt p, and also of the head or jam-nut r at the end of said bolt, by which the parts are firmly united. The exterior thread on the sleeve-nut or hollow bolt q is fitted to an interior thread in the eye of the movable portion of the socket-connection so that, by rotating both the nut or hollow bolt q and the bolt p, the movable portion of the socket-connection can be moved to or from the stationary portion. When the wrist-pin is not used, the socket-connection G, attached to the rod as shown in Figs. 7 and 8, is provided with a ball which is embraced within a socket, adjustable substantially as described in the crank-arm D, which, as shown, will be hinged to the crank-head at a point between the crank-shaft and the ball, instead of being hinged on the opposite side of the shaft, as shown in Fig. 3. This socket-connection G' may either be keyed to the rod, as shown in Fig. 7, or be loose on the rod, as shown in Fig. 8. As illustrated in Fig. 4, it will be obvious that on each full rotation of the crank-shaft with the socket-connection shown in that figure, and in Nos. 1, 2, and 3, the rod will be rotated about one hundred and eighty degrees, or nearly a quarter turn each way; also, that if the connection shown in Fig. 7 be employed the rotative movement of the rod will be but about ninety degrees, or, say, one-eighth of a revolution each way, while if the connection G' be not keyed to the shaft, but is simply confined between two collars adjustably set on the rod, as shown in Figs. 8 and 9, there will be no rotation of the rod. In this latter form of construction an adjustable bearing should be employed, so as to prevent the connection from wearing too loose on the rod, as shown in both the figures named.

It will be seen that the rotatory movement of the rod E depends upon the distance from the axis of the rod to the point at which the socket-connection is effected with the crank-arm D, and that as much or as little of this movement may be attained as the constructor may desire.

I have shown these different methods of connecting, by a universal joint, the vibrating crank-arm with the reciprocating rod, and am aware that it is quite probable that universal joints of other kinds may be employed with approximate results, and I do not, therefore, limit myself to the precise ball-and-socket connection shown and described, as any universal joint which will admit of the essential movements of the parts thereby joined, would, if employed in this connection, embody the spirit of my invention.

I am well aware that my present invention is applicable to many machines. I have myself practically developed its value in many cases; as, for instance, I have embodied the invention in steam-engines as illustrated in Figs. 1 to 6, not only in those engines which are operated by slide-valves, but also those in which the pistons operate, also, as valves. In pumps or motors, the connection illustrated in Figs. 7 and 8 is especially valuable, on account of the uniform and regular movement of the rod, which is secured by the location of the crank-arm and its axis wholly on one side of the crank-shaft.

The operation of the movement is too obvious, after this detailed description, to require a very extended explanation, and it is hardly necessary to recite that the ball-and-socket connection, being free to swing at right angles to the longitudinal axis of the reciprocating rod, either with the rod or independently of it, and that the crank-arm being free to swing outward from the face of the crank-head, that the connection between the crank shaft and rod must always be steadily maintained, and that in every complete revolution of the crank-shaft the crank-arm must twice move from and to the crank-head, and that the socket-connection on the rod must make, during its longitudinal movement, partial rotations corresponding to the said movements of the crank-arm.

In Fig. 9, it will be seen that one end of the rod E is square, and that the socket-connection is mounted on a conical enlargement thereof in such a manner that the wear thereon may be compensated by an obvious adjustment. The square end, when fitted to a slide-bearing, will effectually prevent any rotation of the rod E.

Having thus described my invention, I claim as new and desire to secure by Letters Patent—

1. The radially-vibrating crank-arm D, pivoted or hinged to the crank-shaft, substantially as described.

2. The combination, substantially as described, of a crank-shaft, a radially-vibrating crank-arm, a longitudinally-reciprocating rod, and a universal-joint connection, whereby the longitudinal movement of the rod, or the rotation of the shaft, will respectively rotate the shaft, or impart to the rod a longitudinally-reciprocating movement, as and for the purposes specified.

3. The combination of a crank-shaft and a radially-vibrating crank-arm with the adjustable collars, fitted to the crank-shaft, in close relation to the bearing, substantially as described, whereby the end strain on the shaft may be borne by the collar, and the wear thereon be compensated, as set forth.

4. The combination of the hinged crank-arm, the ball-headed wrist-pin, and its socket, substantially as described.

5. The combination of the vibrating crank-arm with the longitudinally-adjustable hinge-pin, substantially as described.

6. The combination of the bow-shaped crank-arm, the hinge-pin, the sleeve-nut or hollow bolt $f$, substantially as described, whereby the parts may be kept in proper relation with each other and with the crank-head without undue compression on the sides of the crank-arm, as set forth.

7. The socket-connection, constructed in two sections, in combination with the main bolt, hollow bolt, and jam-nut, substantially as described.

8. The combination of the crank-shaft, the crank-arm, and the reciprocating rod, with a socket-connection, which is keyed or fastened to the rod, substantially as described, whereby the rod may be partially rotated during the longitudinal movement, as set forth.

9. The combination of the crank-shaft, the crank-arm, and the reciprocating rod, with a socket-connection, which is loosely mounted on the rod and free to partially rotate thereon, substantially as described, whereby the rod, while being moved longitudinally cannot be rotated by the connection, as set forth.

RUDOLF EICKEMEYER.

Witnesses:
JONATHAN VAIL,
JOHN H. KEELER.